United States Patent [19]

Smith

[11] 4,364,332

[45] Dec. 21, 1982

[54] INTEGRALLY CONSTRUCTED POULTRY NESTING HOUSING FOR AUTOMATICALLY COLLECTING EGGS

[76] Inventor: William V. Smith, Rte. 2, Liberty, N.C. 27298

[21] Appl. No.: 306,693

[22] Filed: Sep. 29, 1981

Related U.S. Application Data

[63] Continuation-in-part of Ser. No. 192,340, Sep. 29, 1980, abandoned, which is a continuation of Ser. No. 29,775, Apr. 13, 1979, abandoned.

[51] Int. Cl.³ ............................................. A01K 31/16
[52] U.S. Cl. ........................................................ 119/48
[58] Field of Search ................................... 119/48, 45

[56] References Cited

U.S. PATENT DOCUMENTS

| | | | |
|---|---|---|---|
| 1,911,633 | 5/1933 | Lohrer | 119/48 |
| 1,926,133 | 9/1933 | Anderson | 119/48 |
| 2,745,379 | 5/1956 | Schmidt | 119/48 |
| 2,892,447 | 6/1959 | Keen et al. | 119/45 R |
| 3,033,162 | 5/1962 | Bailey | 119/48 |
| 3,124,102 | 3/1964 | Kurtz et al. | 119/48 |
| 3,650,246 | 3/1972 | Fowler et al. | 119/48 |

Primary Examiner—Hugh R. Chamblee
Attorney, Agent, or Firm—Mills & Coats

[57] ABSTRACT

The present invention relates to a automatic egg collection system that comprises an elongated integrally constructed housing including two spaced apart rows of individual laying nests that are inclined such that the eggs laid in the respective nests are induced by gravity to move inwardly towards a common central conveying system that collects eggs from each row of nests and conveys them from the housing structure to a central collection area. The nest and complete housing is unitized to form a relatively simple single structure. When installed, respective nesting housings can be aligned to receive and cooperate with one central conveyor system for collecting eggs within a laying house.

10 Claims, 5 Drawing Figures

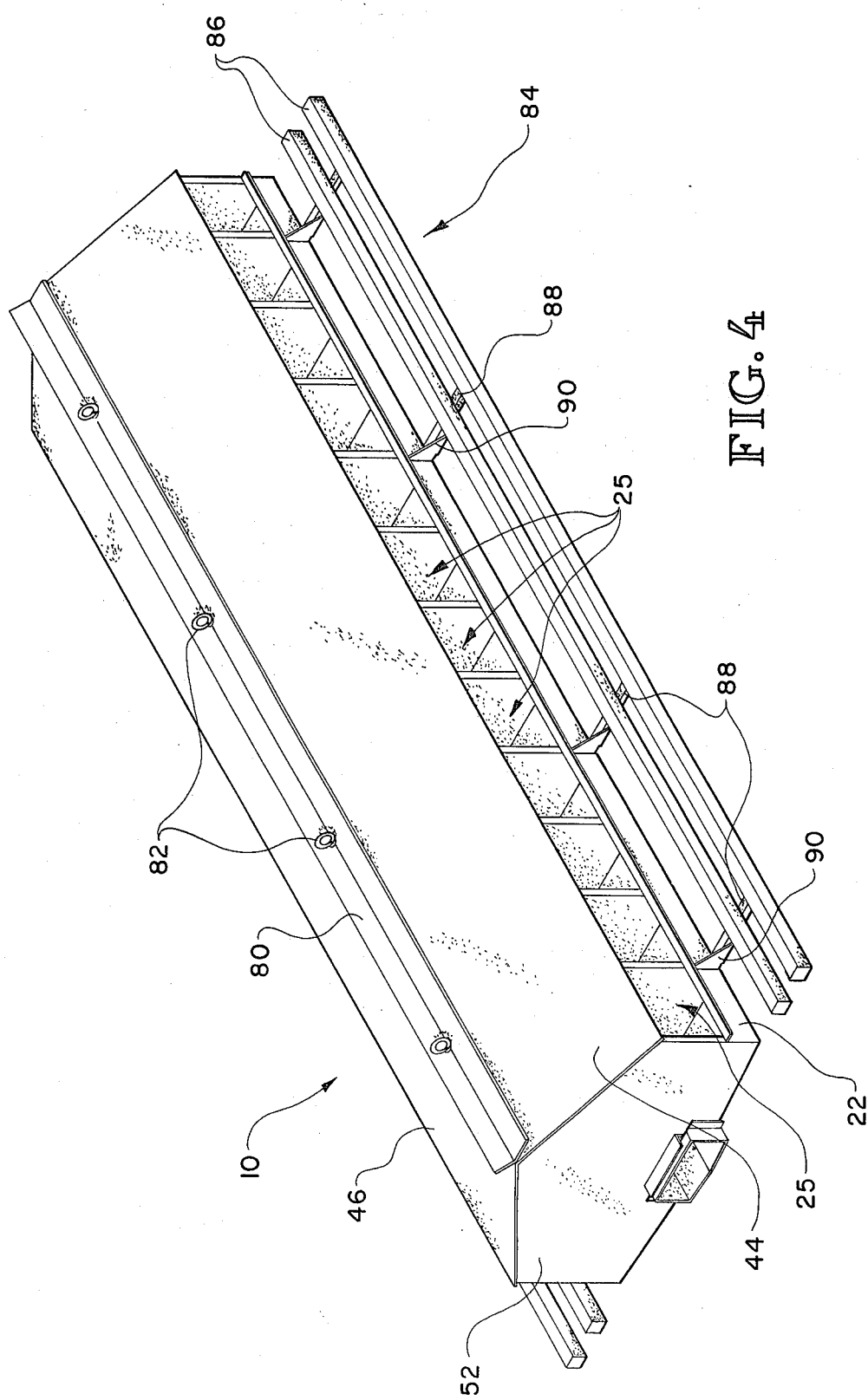

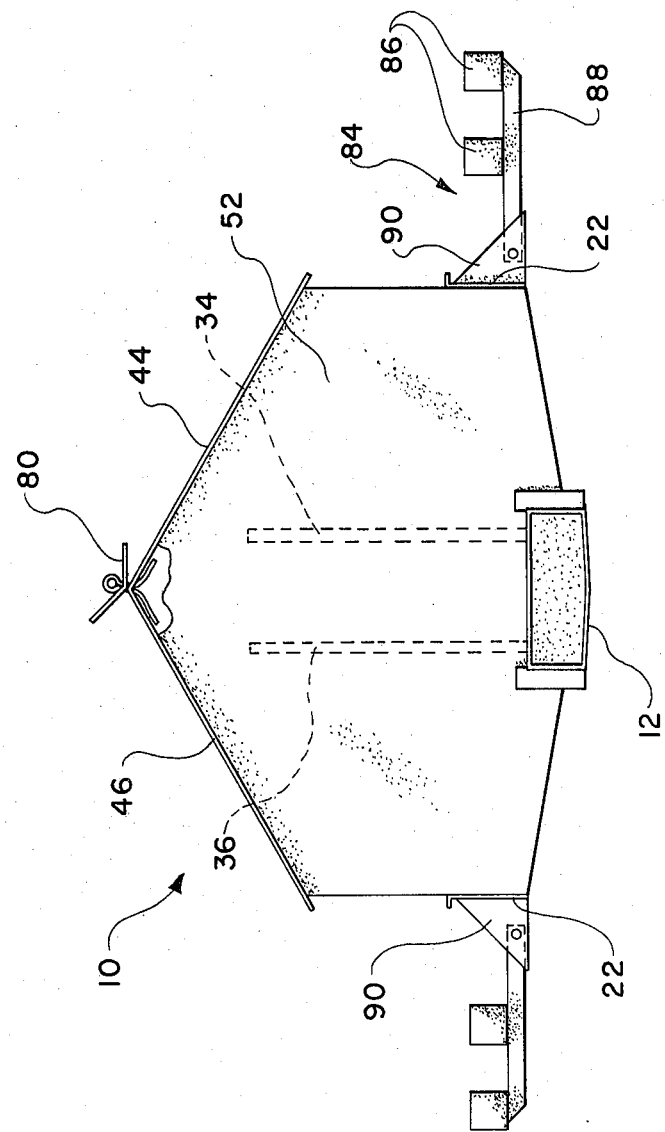

INTEGRALLY CONSTRUCTED POULTRY NESTING HOUSING FOR AUTOMATICALLY COLLECTING EGGS

This is a continuation-in-part of U.S. patent application Ser. No. 192,340, filed Sept. 29, 1980, now abandoned, which was a continuation of U.S. patent application Ser. No. 29,775, filed Apr. 13, 1979, now abandoned.

The present invention relates to automatic egg gathering and collection system and more particularly to an integrally constructed and unitized double nest row laying housing.

BACKGROUND OF THE INVENTION

Gathering and collecting eggs manually within a hen or laying house is obviously very inefficient as the same is a time consuming and laborious job. In addition, the eggs are often not very clean, there are significant floor eggs, and the overall quality of the eggs leaves something to be desired. In the case of hatching eggs, the hatching rate is often less optimum where the eggs are gathered and collected manually.

In recent years, many poultry laying houses have moved to some type of cage or nest system such as shown in U.S. Pat. Nos. 3,306,259; 3,139,065; 3,107,652; and 2,710,682. These have generally increased the efficiency of egg collection as well as the overall quality of the eggs. But many of these systems are complex, expensive, difficult to install and move within the laying house and even difficulty to clean and maintain. Quite often in such conventional systems the main frame or support structure, the respective nest, and the conveying systems are designed and installed separately, which can result in the overall system being structurally overdesigned which gives rise to the fact that many of these systems are relatively expensive.

SUMMARY OF INVENTION

The present invention entails an integrally constructed generally enclosed laying house that is relatively simple and inexpensive but which is quite functional. In the preferred embodiment disclosed herein, the nest housing is basically constructed of sheet metal and includes two laterally spaced nest rows integrally formed as a part of the laying housing, and wherein a roof structure extends over and encloses both nest rows. A central, longitudinally extending alley way is defined between the nest rows of receiving and supporting a conveyor means or conveyor belt centrally therethrough such that eggs from the nest rows can gravitate onto the conveyor means and can be conveyed from the nest housing.

In practice, the respective nest or laying houses can be aligned within the hen house to receive and cooperate with one central conveyor system, thereby giving rise to a portable and modular quality that gives them additional utility and enables them to be functional and adaptable to almost all laying houses irrespective of their particular design.

It is, therefore, an object of the present invention to provide a nesting and laying structure for automatically collecting eggs that is relatively simple and inexpensive, easy to install and maintain, and which is particularly compatible and adaptable with different hen house designs.

A further object of the present invention is to provide a unitized, integrally constructed nesting structure wherein the individual nests are all integrally constructed as a part of one single housing.

Still a further object of the present invention is to provide a generally closed integrally constructed laying structure of the character described above that is designed to facilitate the production of clean and high quality eggs.

Another object of the present invention resides in the provision of an integrally constructed laying and egg collection structure that includes laterally spaced nest rows and includes means for receiving and cooperating with a central conveyor system.

Yet another object of the present invention is to provide a unitized and integrally constructed laying and egg collection structure that is generally portable and modular in nature, wherein individual nesting structures are compatible with each other and can be utilized in a system design.

A further object of the present invention is to provide a modular nesting structure with easily accessible individual nesting compartments that are all integrally constructed into one nesting module.

Other objects and advantages of the present invention will become apparent from a study of the following description and the accompanying drawings which are merely illustrative of the present invention.

BRIEF DESCRIPTION OF THE DRAWINGS

FIG. 4 is a perspective view of a second species of the integrally constructed poultry nesting housing of the present invention.

FIG. 5 is an end view of the second species of the integrally constructed poultry nesting housing of the present invention.

DESCRIPTION OF PREFERRED EMBODIMENT

Figure 1:
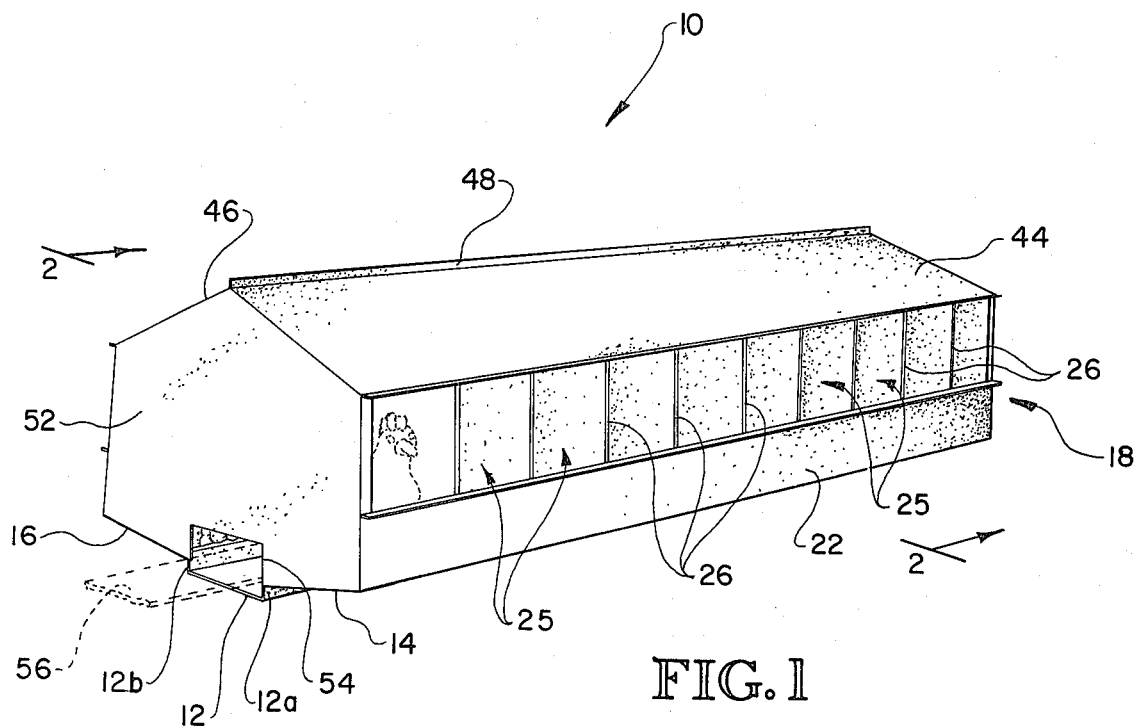
FIG. 1 is a perspective view of the integrally constructed poultry nesting housing of the present invention.
Figure 2:
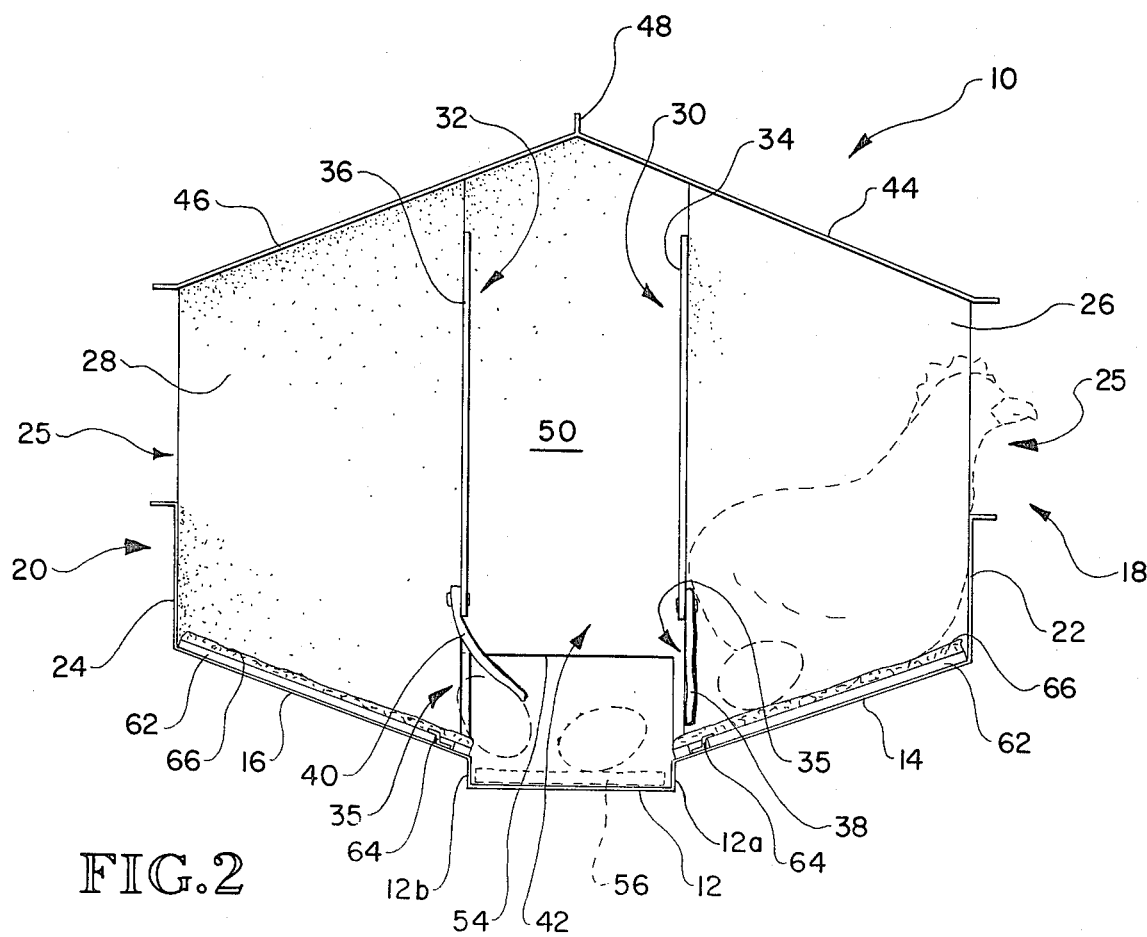
FIG. 2 is a sectional view along lines 2—2 in FIG. 1.

With further reference to the drawings, particularly FIGS. 1 and 2, the integrally constructed nesting structure or housing of the present invention is shown therein and indicated generally by the numeral 10. Viewing the nesting structure 10 in detail, it is seen that the same includes a bottom structure including an elongated central conveyor support panel 12 that is of a generally flat shape and includes a pair of upstanding legs 12a and 12b (FIG. 2). Extending outwardly from legs 12a and 12b is a pair of floor sections 14 and 16 that are generally inclined upwardly and outwardly from the central conveyor support panel 12. In this preferred embodiment disclosed herein, the central conveyor support panel 12 and floor sections 14 and 16 are continuously constructed together to form the entire bottom area of the nesting structure 10.

Extending upwardly from the outer longitudinal edges of floor sections 14 and 16 are outer side means 18 and 20. Outer side means 18 and 20 includes a pair of closed side panels 22 and 24 that extend longitudinally from one end of the nesting structure or housing 10 to the other. Each side panel 22 and 24 includes an upper terminal edge that terminates intermediately between the upper and lower portions of the sides thereof so as to define an upper open side area about each of said outer side means 18 and 20.

About each floor sections 14 and 16, there is provided a series of longitudinally spaced partitions 26 on one side and 28 on the other side. Partitions 26 and 28 are longitudinally spaced and extend over the respective floor sections 14 and 16 and are oriented generally perpendicularly with respect to side panels 22 and 24.

Formed across the inner edges of partitions 26 and 28 are a pair of inner side means 30 and 32. The inner side means 30 and 32 includes retaining walls 34 and 36 respectively that are secured across the inner edges of the partitions 26 and 28. Formed along the lower portion of the inner side means 30 and 32 adjacent the central conveyor support panel 12 is a plurality of egg outlet openings 35. Secured about the egg outlet openings 35 is baffle means, the baffle means disposed below retaining wall 34 being referred to as numeral 38 while the baffle means disposed below retaining wall 36 is referred to by numeral 40.

Inner side means 30 and 32 and in particularly retaining walls 34 and 36 are laterally spaced apart so as to define a central and longitudinally alley way 42 extending longitudinally through the nesting structure or housing 10.

Extending from outer side means 18 over floor section 14 is a roof panel 44. Likewise, roof panel 46 extends from the other outer side means 20 and over floor section 16 where the same joins with the other roof panel 44 to form a longitudinal ridge 48 so as to enclose the entire upper area of the nesting structure or housing 10.

It is thusly appreciated that the nesting structure or housing 10 discussed hereinabove forms two nest rows, one nest row extending over floor section 14 while the other nest row extends over floor section 16. Thus, defined between successive partitions 26 and 28 and between the outer and inner side means 18 and 30 or 20 and 32 is a nesting area or compartment. The laying hen may gain access to the respective defined nest area through access opening, referred to generally by the numeral 25, which are defined by the outer edges of the partitions 26 and 28 and the upper terminal edges of side panels 22 and 24 and the outer edges of roof panels 44 and 46.

The ends of the nesting structure or housing 10 is closed by a pair of end panels 50 and 52, with each end panel including conveyor cutouts 54 that are aligned with the central alley way 42 and disposed adjacent central conveyor support panel 12.

Disposed about the lower inner edge of each floor panel 14 and 16 between successive partitions 28 or 26 is a generally Z-shaped clip structure 64. Clip structure 64 extends upwardly from the floor panel and is adapted to receive a wood floor panel 62 and to hold the same firmly in place. Disposed over the wood panel 62 is a carpet flooring material or other form of soft cloth or fabric type material that forms the upper exterior surface of each defined nesting area. Consequently, as illustrated in FIG. 2, a hen is shown in a laying position in the right-hand exposed nesting compartment over floor section 14. It is appreciated that an egg layed by the hen can drop onto the upper carpet material 66 and because of the incline floor section 14, the egg would tend to roll towards the egg outlet opening 35 where the same would engage and pass through the baffle means 38.

To receive the eggs within the defined central alley way 42, a conveyor belt or conveyor 56 is threaded through the conveyor cutouts 54 so as to extend entirely through the nesting structure or housing 10. Consequently, conveyor belt 56 is supported by central conveyor support panel 12 and is generally disposed, such as shown in FIG. 2, so as to receive eggs from each of the nest rows disposed on each side of the central conveyor support panel 12.

In the preferred embodiment disclosed herein, it is contemplated that the nesting structure or housing 10 would be constructed of sheet metal, such as 24 gauge sheet metal. But it is understood that the same could be constructed of other suitable materials.

With reference to FIGS. 4 and 5, there is shown therein a second species of an integrally constructed poultry nesting structure of the present invention. Essentially, the second species shown in FIGS. 4 and 5 is very similar to that already discussed hereinabove. The basic areas of difference between the first species shown in FIGS. 1 through 3 and the second species shown in FIGS. 4 and 5 is that the second species includes an anti-roost bar 80 movably mounted along its top ridge and further includes a perch area 84 disposed along each side of the housing structure.

Viewing the perch area 84 in detail, it is seen that the same includes a plurality of elongated runners 86 which could be constructed of any suitable material such as two-inch by two-inch wood strips. Elongated runners 86 are supported and maintained in parallel relationship by a plurality of laterally spaced cross ties 88. Cross ties 88 are in turn secured to respective support gussets 90 that are secured to and extend from the lower side wall structure 22 of the poultry housing.

Referring back to the anti-roost bar 80, it is seen that the same comprises an elongated angle member that is secured at selected points along the top ridge of the housing by connectors 82. Although various forms of connectors may be used, it is contemplated that the anti-roost bar 80 can be appropriately connected thereat by cotter pins or other forms of loose type connectors that enable the anti-roost bar 80 to move back and forth over the ridge in response to chickens landing thereon. It follows because of the unstableness of the anti-roost bar, that chickens will be unable to light and roost thereon.

Figure 3:
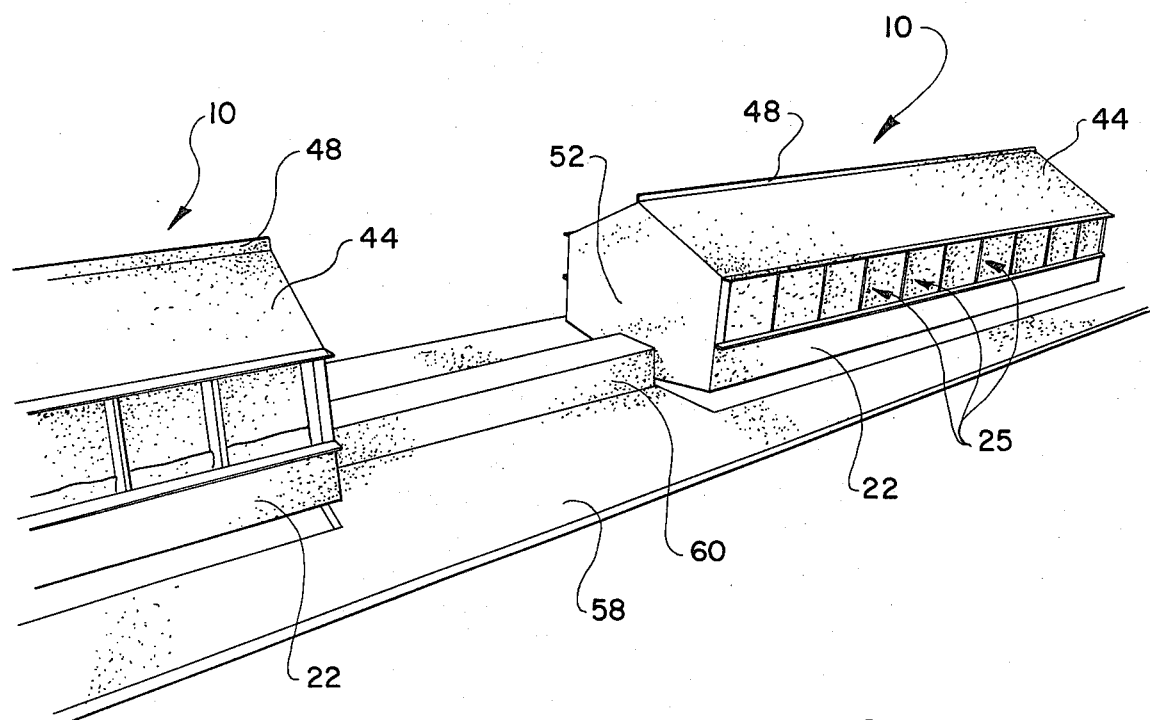
FIG. 3 is a fragmentary perspective view illustrating the modular feature of the present invention as two nesting housings are shown in longitudinal alignment with a conveyor means extending therethrough.

In use, as illustrated in FIG. 3, the respective nesting structures or housings 10 can be aligned and supported by a support structure such as indicated by numeral 58 in FIG. 3. In this case, a conveyor bridge panel 60 can be extended between respective end portions of adjacent nesting structures so as to extend over the exposed conveyors extending between the nesting housings or structures 10. It is appreciated that the conveyor belt 56 would form a part of a centrally conveyor system that would be provided with means for driving the conveyor belt 56 through each of the nesting structure or housing 10 being utilized within a system within a conventional hen house.

From the foregoing discussion, it is appreciated that the nesting structure or housing 10 of the present invention is particularly unique since it is of an integrally constructed design that includes a pair of laterally spaced nest rows contained within one single unitized housing structure. All of the defined laying nests are served by the one conveyor belt or conveyor 56 that extends essentially through the alley way 42 defined by the inner side means 30 and 32. It is appreciated that the nesting structure or housing 10 is simple in construction, relatively inexpensive, durable and because of its portable and modular nature can be utilized in different orientations within a hen house and is particularly useful because its design allows the same to be compatible with hen houses of different designs.

The terms "upper", "forward", "rearward", etc., have been used herein merely for the convenience of the foregoing specification and in the appended Claims to describe the integrally constructed poultry nesting housing and its parts as oriented in the drawings. It is to be understood, however, that these terms are in no way limiting to the invention since the integrally constructed poultry nesting housing may obviously be disposed in many different positions when in actual use.

The present invention, of course, may be carried out in other specific ways than those herein set forth without departing from the spirit and essential characteristics of the invention. The present embodiments are, therefore, to be considered in all respects as illustrative and not restrictive and all changes coming within the meaning and equivalency range of the appended claims are intended to be embraced therein.

What is claimed is:

1. An automatic egg collecting system comprising an elongated unitized single story housing structure including two spaced apart nest rows, each nest row having a series of longitudinally aligned nest disposed in side-by-side relationship, each nest row including an outer side, an inner side, a plurality of longitudinally spaced nest partitions extending between said outer and inner sides and an incline bottom inclined generally downwardly from the outer side towards the inner side, and wherein said inner sides of said nest rows are laterally spaced apart so as to define an alley extending therebetween; said outer sides including longitudinally extending sheet metal walls extending along the lower portion of said outer side, and wherein said outer sheet metal wall terminates intermediately between the upper and lower extremities of the outer sides so as to define said access opening to the respective nest; said inner side of each nest row including a retaining wall and an egg outlet opening means formed about an area adjacent the bottom of said nest; baffle means disposed within said egg outlet means for directing eggs from the bottom of each nest through said outlet opening means in a gentle fashion; said laterally spaced nest rows forming a part of said integrally constructed single story housing structure by the provision of roof means that extends over the top of said nest rows and on over said alley to enclose the top of said single story housing structure and to form the entire top thereof; end walls secured across each end of said unitized single story housing structure; conveyor support means extending between the inner sides of said nest rows adjacent the egg outlet opening means for supporting conveyor means thereon, said conveyor support means extending between the inner terminal edge of the bottom of said nest and integrally constructed therewith to form a part of the bottom of said nest housing structure and wherein said conveyor support means is spaced below the lowest level of said bottom; end opening means formed in said end wall and aligned with said conveyor support means for enabling said conveyor means to extend longitudinally through said unitized housing structure; and an unstable anti-roost bar assembly movably mounted along the top of said housing structure for effectively discouraging chickens from landing thereon and roosting on top of the housing structure, said anti-roost bar assembly including an elongated resting bar and connector means movably mounting said elongated resting bar to said housing such that said elongated resting bar is unstable and tends to dump the chickens therefrom as they attempt to stand and roost thereon.

2. The egg collection system of claim 1 wherein the bottom of said nests further includes a wood panel covered with a carpet type material.

3. The egg collection system of claim 2 further including a clip structure disposed about the bottom of each nest row for receiving and holding said wood bottom panel in place.

4. The improved egg collection system of claim 3 wherein said conveyor support means comprises a generally flat shaped metal panel integrally connected between the bottom of each nest row.

5. The automatic egg collecting system of claim 1 wherein said elongated resting bar is angled to form two surfaces wherein the angle between the respective surfaces is an obtuse angle.

6. The automatic egg collecting system of claim 5 wherein said connector means includes a plurality of cotter pins that generally loosely connect said elongated resting bar to said housing structure.

7. The automatic egg collecting system of claim 1 including a perch area disposed on at least one side of said housing, said perch area including an elongated platform structure having a generally horizontal surface, and support means secured to said platform structure and extending therefrom inwardly to where the same connects to said housing structure for supporting the same outwardly of said housing.

8. The automatic egg collecting system of claim 7 wherein said platform surface includes a plurality of elongated members that are laterally spaced apart and spaced outwardly from said housing, and a plurality of transverse ties secured to said elongated members and extending inwardly where the same are operatively connected to a respective side of said housing structure.

9. A unitized elongated single story poultry nesting housing for automatically directing eggs from nesting areas onto a central conveyor, comprising: an integrally formed bottom having an elongated central conveyor support panel and two opposed longitudinally extending floor sections that extend generally upwardly and outwardly from opposite sides of said central conveyor support panel, said central conveyor support panel having a generally flat shape and including a pair of laterally spaced upwardly extending legs that join the lower inner edges of the respective floor sections to form a single one piece bottom floor structure with said conveyor support panel disposed below said floor sections; outer side means extending upwardly from the outer elevated edge portions of each of said floor sections and including a longitudinally extending wall that extends along a lower portion thereof and includes an upper terminal edge so as to define an upper open area that allows access to the interior of said housing; inner side means extending upwardly from the inner lower edge portions of both floor sections in generally parallel alignment with said outer side means so as to define an open alley way therebetween and over said central conveyor support panel, said inner side means including a retaining wall and lower egg outlet opening means formed therealong and adjacent said central conveyor support panel for allowing eggs to gravitate from the floor sections through said egg outlet opening means; a plurality of nest partitions that extend between said outer and inner side means above each floor section and which are longitudinally spaced to form a row of nest areas on each side of said central conveyor support panel; baffle means operatively disposed about said egg outlet opening means for engaging eggs passing therethrough and effectively decreasing the speed at which the eggs exit the nest area; a roof integrally constructed between each of the two nest rows extending from the opposed outer side means inwardly over said inner side means and on over said alley way to enclose the entire top area of said housing structure; end walls disposed across each end of said housing so as to generally enclose the sides of said two nest rows and to generally close the ends of said housing structure; conveyor cutout means formed in each end wall and aligned with said central conveyor support panel; and central conveyor means threaded through said conveyor cutout means and supported on said central conveyor support panel for conveying eggs from respective nest from said integrally constructed housing structure to a remote collection area.

10. The unitized poultry nesting housing of claim 9 wherein each floor section includes a sheet metal bottom, a wood panel disposed over said sheet metal bottom, clip means extending from said bottom and engaging said wood panel for holding and retaining the same thereabout, and a cloth like fabric upper covering disposed over said wood panel.

* * * * *